US010332370B2

(12) United States Patent
Frenette et al.

(10) Patent No.: US 10,332,370 B2
(45) Date of Patent: Jun. 25, 2019

(54) SYSTEM AND METHOD FOR ENERGY SAVING ON ACCESS CONTROL PRODUCTS

(71) Applicant: Sensormatic Electronics, LLC, Boca Raton, FL (US)

(72) Inventors: Stephan Frenette, Montreal (CA); Gabriel Labrecque, Saint-Jean-sur-Richelieu (CA); Jean-Sebastien Decoste, St-Hubert (CA)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 15/478,996

(22) Filed: Apr. 4, 2017

(65) Prior Publication Data
US 2018/0286203 A1  Oct. 4, 2018

(51) Int. Cl.
G08B 13/00 (2006.01)
G08B 13/22 (2006.01)
G07C 9/00 (2006.01)
G06F 1/3206 (2019.01)
G06F 1/3234 (2019.01)
(Continued)

(52) U.S. Cl.
CPC ............ *G08B 13/22* (2013.01); *G06F 1/325* (2013.01); *G06F 1/3206* (2013.01); *G07C 9/00007* (2013.01); *G07C 9/00174* (2013.01); *G07C 9/00571* (2013.01); *F24F 11/46* (2018.01); *F24F 2120/10* (2018.01); *G07C 9/00904* (2013.01); *G07C 2009/00579* (2013.01); *H04W 52/02* (2013.01)

(58) Field of Classification Search
CPC .............................. H04W 4/02; G01S 5/0289

USPC ............... 340/572.1, 572.8, 541, 10.1, 10.3; 235/385, 492, 382
See application file for complete search history.

(56) References Cited

U.S. PATENT DOCUMENTS 5,541,585 A * 7/1996 Duhame ............ G07C 9/00111
235/382
5,682,032 A * 10/1997 Philipp ............... G06K 7/10326
235/422

(Continued)

FOREIGN PATENT DOCUMENTS

WO WO 2013169735 11/2013

OTHER PUBLICATIONS

European Search Report, dated Aug. 10, 2018, from European Application No. 18164355.2, filed on Mar. 27, 2018. Eight pages.

*Primary Examiner* — Tai T Nguyen
(74) *Attorney, Agent, or Firm* — HoustonHogle LLP

(57) ABSTRACT

A system and method for energy saving on access control products is disclosed. An access controller controls access control readers, which in turn enable access to a building and/or interior areas of the building. The access controller can identify the locations of the access control readers relative to the building, such as whether the access control readers are located on the perimeter of the building for controlling access to the building, or whether the access control readers are located within the building for controlling access to interior areas of the building. The access controller can then place one or more of the access control readers into a power saving state without compromising overall building security, such as placing interior access control readers into a power saving state when the building is assessed to be unoccupied.

18 Claims, 6 Drawing Sheets

(51) Int. Cl.
  *H04W 52/02* (2009.01)
  *F24F 120/10* (2018.01)
  *F24F 11/46* (2018.01)

(56) References Cited

U.S. PATENT DOCUMENTS

| | | | |
|---|---|---|---|
| 8,240,085 B2 * | 8/2012 | Hill | E06B 7/32 |
| | | | 160/180 |
| 2006/0255129 A1 * | 11/2006 | Griffiths | G07C 1/10 |
| | | | 235/382 |
| 2010/0063641 A1 | 3/2010 | Scholten | |
| 2010/0066505 A1 * | 3/2010 | Shiotsu | G06K 7/0008 |
| | | | 340/10.3 |
| 2011/0102134 A1 | 5/2011 | Venkatesan et al. | |
| 2013/0300564 A1 * | 11/2013 | Lamb | G08B 25/008 |
| | | | 340/573.4 |
| 2017/0228953 A1 * | 8/2017 | Lupovici | G07C 9/00309 |

* cited by examiner

| access control reader name | ID number | location | internal (1) or perimeter (0) |
|---|---|---|---|
| frictionless access control reader 48 | 0x0001 | controls access to room1 | 1 |
| biometric access control reader 28 | 0x0002 | controls access to room3 | 1 |
| identity card access control reader 18-1 | 0x0003 | controls access to room2 | 1 |
| identity card access control reader 18-2 | 0x0004 | controls access to room2 | 1 |
| identity card access control reader 18-p | 0x0005 | controls access to building | 0 |
| networked access control reader 68 | 0x0006 | controls access to room1 | 1 |

FIG. 3

SYSTEM AND METHOD FOR ENERGY SAVING ON ACCESS CONTROL PRODUCTS

BACKGROUND OF THE INVENTION

Security systems are often installed within and around buildings such as commercial, residential, or governmental buildings. Examples of these buildings include offices, hospitals, warehouses, schools or universities, shopping malls, government offices, and casinos. The security systems typically include components such as access control systems, surveillance cameras, image analytics systems, network video recorders (Milks), security alarm panels and devices connected to those panels to list a few examples.

The security devices of the security alarm panels include motion sensor devices and relays, for example. Motion sensor devices can detect intrusions and relays can detect door or windows being opened. These devices are used to detect unauthorized access to the premises, and send indications of the intrusions to the security panel.

Access control systems in buildings, for example, are principally concerned with physical security and the selective access to, restriction of, and/or notification of access to an area or other resource. In a business setting, for example, each employee or other individual can have different levels of security access based on their job function, and the access control system can enforce these access policies at the level of the individual access control readers. For example, an accounting employee may obtain access to a workplace building via an access control reader located at the perimeter of the building. Once inside, however, the same employee is not authorized to access an engineering area or physical plant maintenance area of the building, the access to which is controlled by access control readers that restrict access to authorized individuals typically having only engineering and plant maintenance job functions, respectively.

The main components of the access control systems are access control readers and possibly door controllers. The access control readers are installed near access points, such as doors or hallways or elevators, and enable presentation of credentials to obtain access to restricted areas such as buildings or areas of the buildings. Typically, individuals interact with the access control readers by swiping keycards or bringing contactless smart cards within range (approximately 2-3 inches or 5 centimeters) of the reader. More recently, frictionless access control systems have become common. In these systems, user devices, such as smart phones or wireless fobs, transmit credentials to nearby readers. The access control readers read the credential information of the users and validate the information possibly by reference to a verification database maintained by an access controller, which confirms the credentials and determines if the individuals are authorized to access the restricted areas. If the individuals are authorized, then the access control readers might signal door controllers to unlock doors or to not generate alarms, in examples.

The access control readers can often be controlled in different ways and can typically receive input power in different ways. In one example, a keycard access control reader can be both controlled by and receive its source of input power from a dedicated output interface/control line of the access controller. For this purpose, the access controller can provide a switched source of 12 VDC or 24 VDC to each keycard access control reader via the dedicated output/control line. In another example, a networked access control reader can receive its control signals over an open, internet protocol (IP) network such as a Local Area Network (LAN) and also has an independent source of input power. In yet another example, a smart card access control reader is controlled by an access controller but relies on an external power module as its source of input power. Here, the power module is also controlled by the access control controller and provides a switched source input power such as 12/24 VDC to the smart card access control reader.

SUMMARY OF THE INVENTION

One problem that has arisen as a result of the increase in deployment of access control readers in buildings is the increase in power collectively consumed by the access control readers and by related components that provide a source of input power to the access control readers, in some configurations. In one example, a typical access control reader having a 24 VDC input power source typically draws one ampere (IA) of current per hour of operation, resulting in an average power consumption of 24 W (i.e. 1 A*24V=24 W). Because access control readers are typically on all the time, i.e. 24 hours a day, 365 days a year, and large buildings such as college campuses, government archives, and office buildings can have possibly hundreds or even thousands of access control readers, the amount of power consumed by the access control readers collectively can be significant.

It would be beneficial to provide an energy saving security system that can place at least some of its access control readers into a power saving state without compromising overall security of the security system. Preferably, a power saving state is a state in which the source of input power is temporarily disabled, such as being suspended or switched off, in response to a condition being satisfied. The source of input power can then be quickly resumed or switched back on once the condition is no longer satisfied.

To save energy, in one example, the present invention can first identify which of its access control readers control access to the building, otherwise known as peripheral access control readers, and which of its access control readers control access to interior areas within a building, otherwise known as internal access control readers. Then, when a condition is satisfied, such as the access controller assessing that the building is unoccupied, the security system can place some of the access control readers (such as some or all of its internal access control readers) into a power saving state to save on power consumption.

A building is assessed to be unoccupied in different ways. In one example, a building is assessed to be unoccupied in response to the access controller determining that no individuals have entered or exited the building via perimeter access control readers over a predetermined time period, such as from a time immediately after normal work hours up until a time just prior to the starting hour of the next work day. In another example, when the access controller is integrated with a security alarm panel, a building is assessed to be unoccupied when the access controller receives a signal sent by the security alarm panel indicating that the security system is armed. In either example, the assessment that the building is unoccupied acts as a trigger for the access controller to place its access control readers in a power saving state.

When the access controller is integrated with a security alarm panel, the security alarm panel receives indications of intrusion at the building from security devices deployed at the building. Using a security keypad, an individual can both arm and disarm the security system via arm and disarm commands sent to the security alarm panel, in examples.

In general, according to one aspect, the invention features a security system. The security system includes access control readers and an access controller. The access control readers control access to a building and/or to interior areas of the building, and the access controller places the access control readers into power saving state when the building is assessed to be unoccupied.

The access control readers include interior access control readers that control access to the interior areas of the building and perimeter access control readers that control access to the building. In one implementation, the access controller places only the interior access control readers into power saving state when the building is assessed to be unoccupied.

Typically, the building is assessed to be unoccupied in response to the access controller receiving a signal indicating that the security system is armed.

Additionally and/or alternatively, the building is assessed to be unoccupied by the access controller receiving indications that individuals have entered and/or exited the building sent from access control readers, where the access controller increments an enter count in response to receiving the indication for each individual entering the building and increments an exit count in response to receiving the indication for each individual exiting the building, and by the access controller identifying that the entrance count and the exit count are equal.

Typically, the access controller places the access control readers into power saving state by disabling control lines of the access controller that control and provide power to the access control readers.

Additionally and/or alternatively, the access controller places the access control readers into power saving state by sending a power disabling control signal to a power module that provides power to the access control readers. Additionally and/or alternatively, the access controller places the access control readers into power saving state by sending a sleep signal over a network to the access control readers.

The security system also includes a security alarm panel that receives indications of intrusions at the building from security devices and that sends alarm signals in response, wherein the access controller places the access control readers out of power saving state in response to the access controller receiving the alarm signals.

The security alarm panel can also send a signal indicating that the security system is disarmed, wherein the access controller places the access control readers out of power saving state in response to the access controller receiving the disarm signal.

In general, according to another aspect, the invention features a method for a security system. The method comprises access control readers controlling access to a building and/or to interior areas of the building, and an access controller placing the access control readers into power saving state when the building is assessed to be unoccupied.

In general, according to yet another aspect, the invention features a security system for a premises. The security system includes access control readers and an access controller. The access control readers control access points of a building, wherein the access points enable access to the premises and/or areas within the premises. The access controller places the access control readers into power saving state based upon locations of the access points relative to the premises when the building is assessed to be unoccupied.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 3 shows exemplary contents of an access reader table utilized by the access controller in the security systems of FIG. 1 and FIG. 2;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
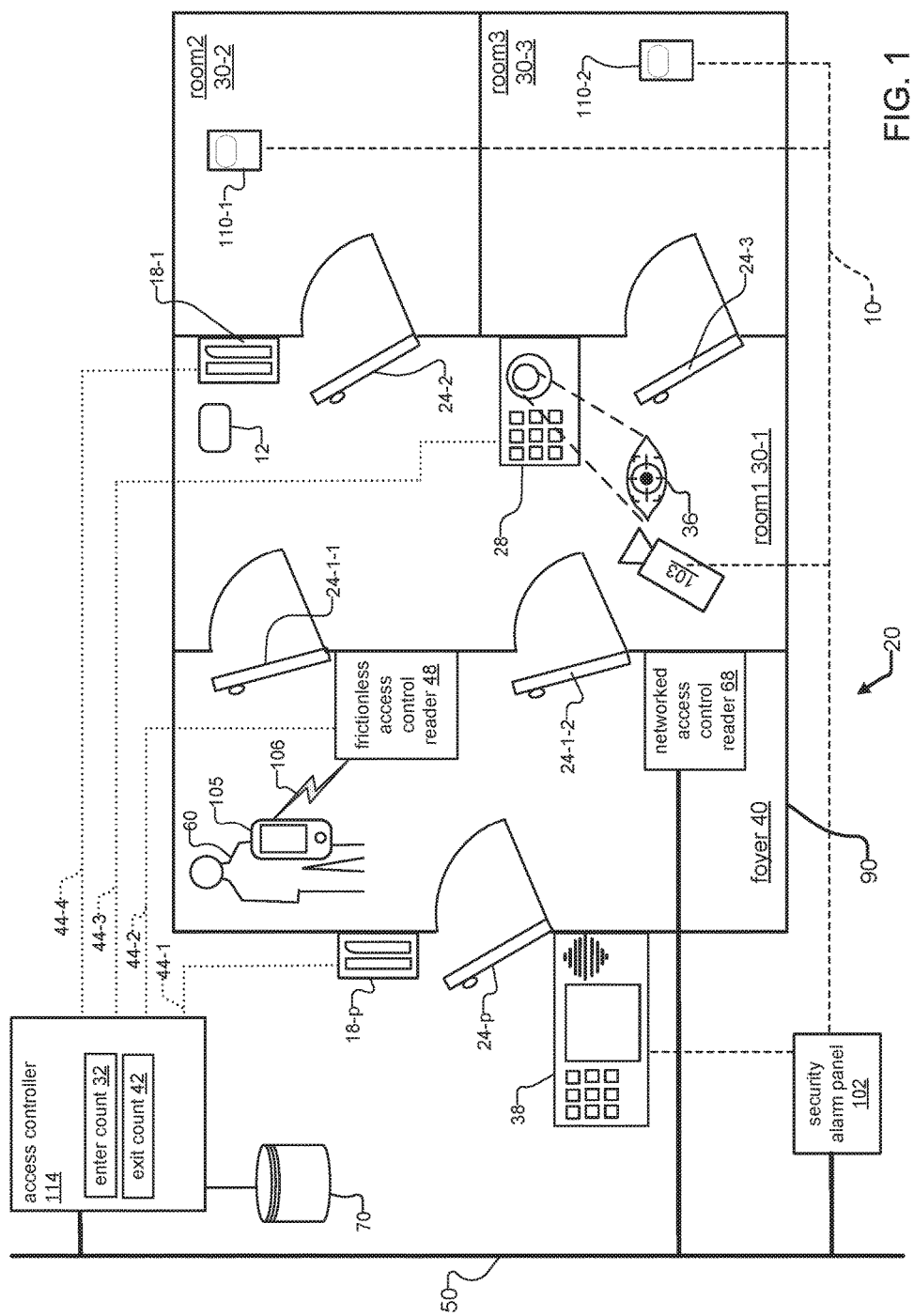
FIG. 1 is a schematic diagram of an energy saving security system showing different types of access control readers deployed within a building, where in accordance with principles of the present invention, an access controller of the security system can place the access control readers into a power saving mode without compromising overall security provided by the security system.

FIG. 1 shows a security system 20 to which the invention is applicable. The security system 20 includes an access controller 114 that controls multiple access control readers deployed at a building 90. The access controller 114 has an interface that enables communications over an enterprise network 50 such as a Local Area Network (LAN) using proprietary and/or standard communications protocols such as Internet Protocol (IP)/Ethernet. The access controller 114 stores information for individuals and the access control readers to a database 70.

Identity card access control reader 18-*p* is connected to control line 44-1 of the access controller 114. The access controller 114 also maintains an enter count 32 and an exit count 42 for individuals entering and leaving the building via identity card access control reader 18-*p*. Control line 44-1 not only controls the identity card access control reader 18-*p* but also is the source of input power for the reader 18-*p*.

Identity card access control reader 18-*p* is located near the perimeter of the building 90 and controls access to building 90 via access point 24-*p*. Access point 24-*p* enables access to foyer 40 of the building 90, through which all individuals typically enter and exit during a work day, in one example. The identity card access control reader 18-*p* can be a keycard identity reader, smart card reader, or any other type of access card reader.

Frictionless access control reader 48 is connected to control line 44-2 of the access controller 114. Control line 44-1 not only controls the frictionless access control reader 48 but also is the source of input power for the reader 48. Frictionless access control reader 48 is located near access point 24-1-1 and controls access to interior room1 30-1 through access point 24-1-1. To obtain access, an individual 60 carrying a mobile device 105 including credentials of the individual must present the mobile device 105 within a threshold area of the frictionless access control reader 48. The credentials of the user are then communicated wirelessly (indicated by reference 106) from the mobile device 105 to the reader 48 using various wireless protocols such as Bluetooth and Wi-Fi, in examples.

Networked access control reader 68 is connected to enterprise network 50 and receives its control signals over the network 50 from the access controller 114. In one example, the networked access control reader 68 has an independent source of input power. In another example, the reader 68 also receives its source of input power via its connection to the network 50, where the access controller 114 provides switched Power over Ethernet (PoE) as the source of input power, in one implementation. Networked access control reader 68 is located near access point 24-1-2 and controls access to interior room1 30-1 through access point 24-1-2. The physical reader mechanism can be a keycard identity reader, smart card reader, or any other type of access card reader.

Biometric access control reader 28 is connected to control line 44-3 of the access controller 114. Control line 44-3 not only controls the biometric access control reader 28 but also is the source of input power for the reader 28, in one implementation. Biometric access control reader 28 is located near access point 24-3 and controls access to interior room3 30-3 through access point 24-3. To obtain access, the reader 28 scans a physical attribute of an individual such as a fingerprint or an iris 36 of the individual.

Identity card access control reader 18-1 is located near access point 24-2 and controls access to room2 30-2 via access point 24-2. The identity card access control reader 18-1 is a keycard identity reader that accepts a keycard 12 which includes credentials of the individual. Identity card access control reader 18-1 is connected to control line 44-4 of the access controller 114. Control line 44-4 not only controls the identity card access control reader 18-1 but also is the source of input power for the reader 18-1, in one implementation.

The access controller 114 can also be integrated with a security alarm panel 102. In the illustrated example, security alarm panel 102 has an interface on the enterprise network 50, which enables communications with the access controller 114. A security keypad 38 allows individuals to change an alarm state of the security system 20 via the security alarm panel 102, where individuals can use the security keypad 38 to place the security system 20 in an armed or disarmed state maintained by the security alarm panel 102.

The security control panel 102 controls and receives indications of intrusions from security devices deployed within the building 90. The indications of intrusions are sent from the security devices to the security alarm panel 102 via security device bus 10. Security devices include motion sensor devices 110, surveillance cameras 103, and possibly door controllers in examples. Motion sensor device 110-1 is located in room2 30-2 and monitors for intrusions within room2 30-2. Motion sensor device 110-2 is located in room3 30-3 and monitors for intrusions within room3 30-3. Surveillance camera 103 is located in room1 30-1 and monitors for intrusions within room1 30-1.

Figure 2:
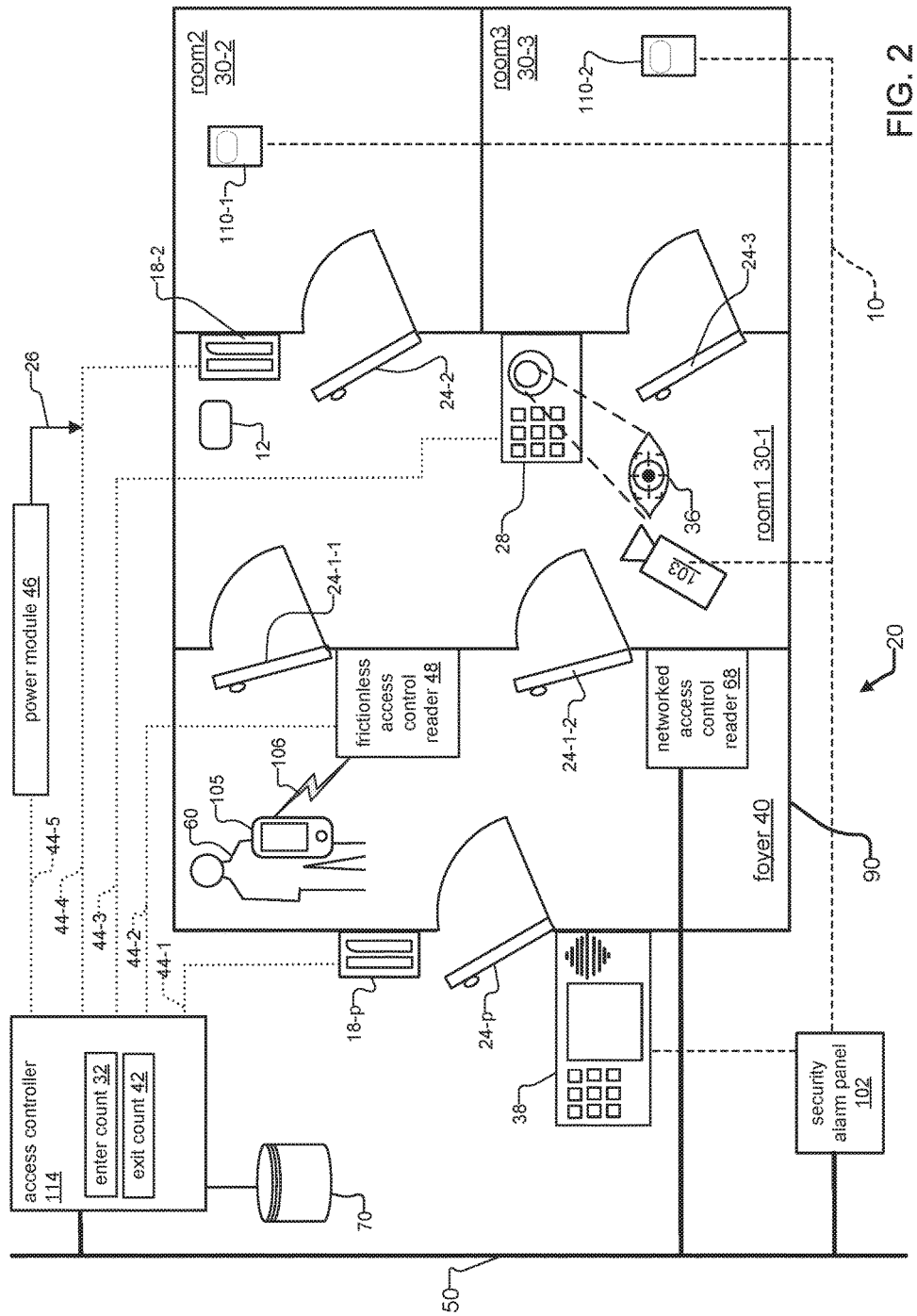
FIG. 2 is a schematic diagram of a security system similar to that illustrated in FIG. 1, where FIG. 2 additionally shows a power module controlled by the access controller that is a source of input power to one of the access control readers.

FIG. 2 shows another example of a security system 20 to which the invention is applicable. The security system 20 includes similar components as in FIG. 1. There are some differences in FIG. 2, however.

The identity card access control reader 18-1 of FIG. 1 that controls access to room2 30-2 has been replaced in FIG. 2 with identity card access control reader 18-2. As with reader 18-1, reader 18-2 is also controlled by control line 44-4 of the access controller 114. In contrast, however, reader 18-2 receives its source of input power from a power module 46, where the source of input power is indicated by reference 26. Typically, the power module 46 is controlled by the access controller 114 via one of its control lines (here, 44-5). The power module 46 provides switched power 26 to the identity card access control reader 18-2. The power module itself is preferably powered by 120 VAC, and can provide different types of switched power 26 including 12/24 VDC, in examples.

FIG. 3 shows exemplary contents of an access control reader table 80 maintained by the access controllers 114 in FIG. 1 and FIG. 2. The access control reader table 80 is included within a database 70. An entry 33 for each access control reader in the security systems of FIG. 1 and FIG. 2 is maintained within the access control reader table 80.

Each entry 33 includes an access control reader name, ID number, location within the building 90, and a value indicating whether the associated access control reader enables access to the building 90 (e.g. is a perimeter access control reader) or enables access to interior areas such as rooms 30 within the building (e.g. is an internal access control reader). The ID number is a unique value associated with each access control reader in the security system 20. In examples, the ID number can be a Media Access Control (MAC) address for an IP/Ethernet enabled access control reader, a Wiegand ID for legacy identity card access control readers, or a proprietary ID number that is unique across all access control readers in the security system 20.

Entry 33-1 for frictionless access control reader 48 includes ID number 0x0001, location information indicating that the reader 48 controls access to room1 30-1, and indicates (e.g. has value of 1) that the reader 48 is an internal access control reader. Entry 33-2 for biometric access control reader 28 includes ID number 0x0002, location information indicating that the reader 28 controls access to room3 30-3, and indicates (e.g. has value of 1) that the reader 28 is an internal access control reader.

Similarly, entry 33-3 for identity card access control reader 18-1 includes ID number 0x0003, location information indicating that the reader 18-1 controls access to room2 30-2, and indicates (e.g. has value of 1) that the reader 18-1 is an internal access control reader. Entry 33-4 for identity access control reader 18-2 includes ID number 0x0004, location information indicating that the reader 18-2 controls access to room2 30-2, and indicates (e.g. has value of 1) that the reader 18-2 is an internal access control reader.

Then, entry 33-5 for identity card access control reader 18-$p$ includes ID number 0x0005, location information indicating that the reader 18-$p$ controls access to the building 90, and indicates (e.g. has value of 0) that the reader 18-$p$ is a perimeter access control reader. Finally, entry 33-6 for networked access control reader 68 includes ID number 0x0006, location information indicating that the reader 68 controls access to room1 30-1, and indicates (e.g. has value of 1) that the reader 68 is an internal access control reader.

Figure 4:
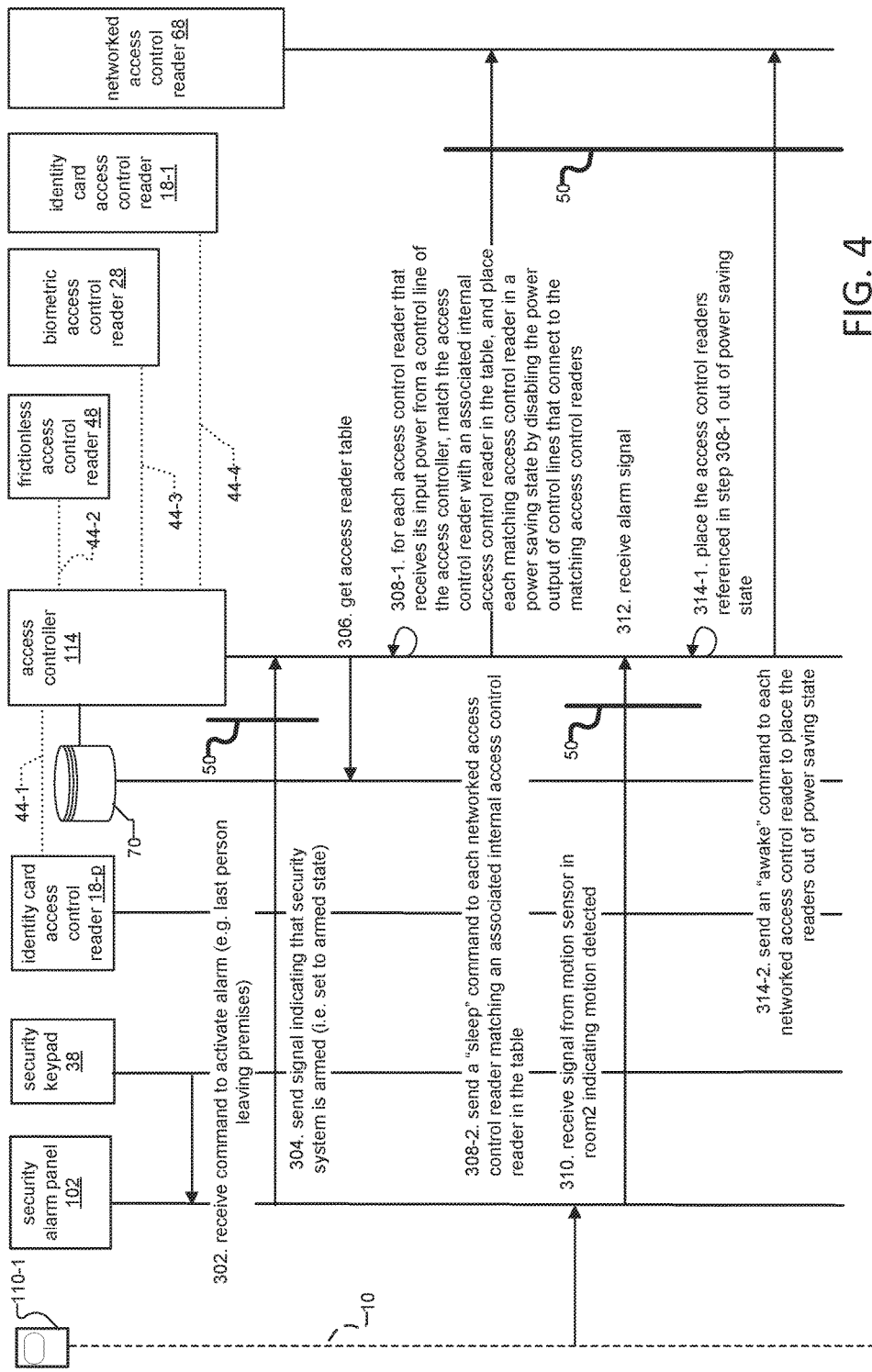
FIG. 4 is a sequence diagram that illustrates one example of operation for the energy saving security system of FIG. 1, when the access controller is integrated with a security alarm panel that receives indications of intrusions at a building from security devices such as motion sensor devices.

FIG. 4 is a sequence diagram that illustrates one example of operation for the security system 20 of FIG. 1. In the example, the security system 20 can place different access control readers in a power saving state in response to the access controller 114 assessing that the building 90 is unoccupied. Here, the building is assessed as being unoccupied in response to the access controller 114 receiving a signal from the security alarm panel 102 indicating that the security system 20 is in an armed state. As the building is assessed to be unoccupied, the access controller 114 can at least place the interior access control readers in a power saving state to save energy, because no individuals are present to access the interior rooms 30 to which the interior access control readers provide access.

Then, at a later time, in response to an indication of intrusion detected by and sent from a motion sensor 110, the access controller 114 places the access control readers out of power saving state.

In step 302, the security alarm panel 102 receives a command to activate the alarm/place the security system in an armed state. In the example, the command is sent by the security keypad 38 by an individual that is the last to leave the building 90 on a normal work day, for example. In step 304, the security alarm panel 102 sends a signal over the network 50 indicating that the security system 20 is armed (i.e. set to an armed state), which the access controller 114 receives over the network 50.

In response to receiving the signal over the network 50 indicating the security system 50 is armed, the access controller 114 obtains the contents of the access reader table 80 in step 306.

Step 308 describes examples for how access control readers of different types can be placed into a power saving mode by the access controller 114. In one example, the access controller 114 places only the interior access control readers into power saving state when the building 90 is assessed to be unoccupied.

In step 308-1, for each access control reader that receives its input power from a control line 44 of the access controller 114, the access controller 114 executes a lookup of the access control readers against entries 33 in the access reader table 80. The access controller 114 matches the access control readers with an associated internal access control reader in the table 80, and places each matching reader in a power saving state by disabling (such as by switching off) the power output of the control line 44 that connects to the matching access control reader. In one example, the access controller 114 determines a match between an access control reader and an associated entry 33 for an access control reader in the table 80 by matching the unique ID number of the access control reader with an ID number included within an entry 33.

As a result of step 308-1 and with reference to FIG. 4, for example, the access controller 114 places the identity card access control reader 18-$p$, the frictionless access control reader 48, the biometric access control reader 28, and the identity card access control reader 18-1 in a power saving state by switching off the power signal normally sent over control lines 44-1, 44-2, 44-3, and 44-4, respectively.

In a similar fashion, in step 308-2, the access controller 114 places access control readers in a power saving state by sending a "sleep" command to each networked access control reader 68 matching an associated internal access control reader in the table 80. Typically, access points 24 such as doors are locked when their associated access control reader is placed in a power saving state.

Then, after a time period, motion sensor 110-1 detects motion within room2 30-2 and sends an indication of intrusion over the security bus 10 to the security alarm panel 102. The security alarm panel 102 receives the indication of intrusion in step 310, and generates an alarm signal over the network 50 in response.

In step 312, the access controller 114 receives the alarm signal sent by the security control panel 102 over the network 50. In response, the access controller 114, in step 314-1, places the access control readers referenced in step 308-1 out of power saving state by resuming switching back on the source of input power to control lines 44-1 through 44-4, in one example. Also in response, in step 314-2, the access controller 112 sends an "awake" command over the network 50 to each networked access control reader 68 to place the readers 68 out of power saving state.

Figure 5:
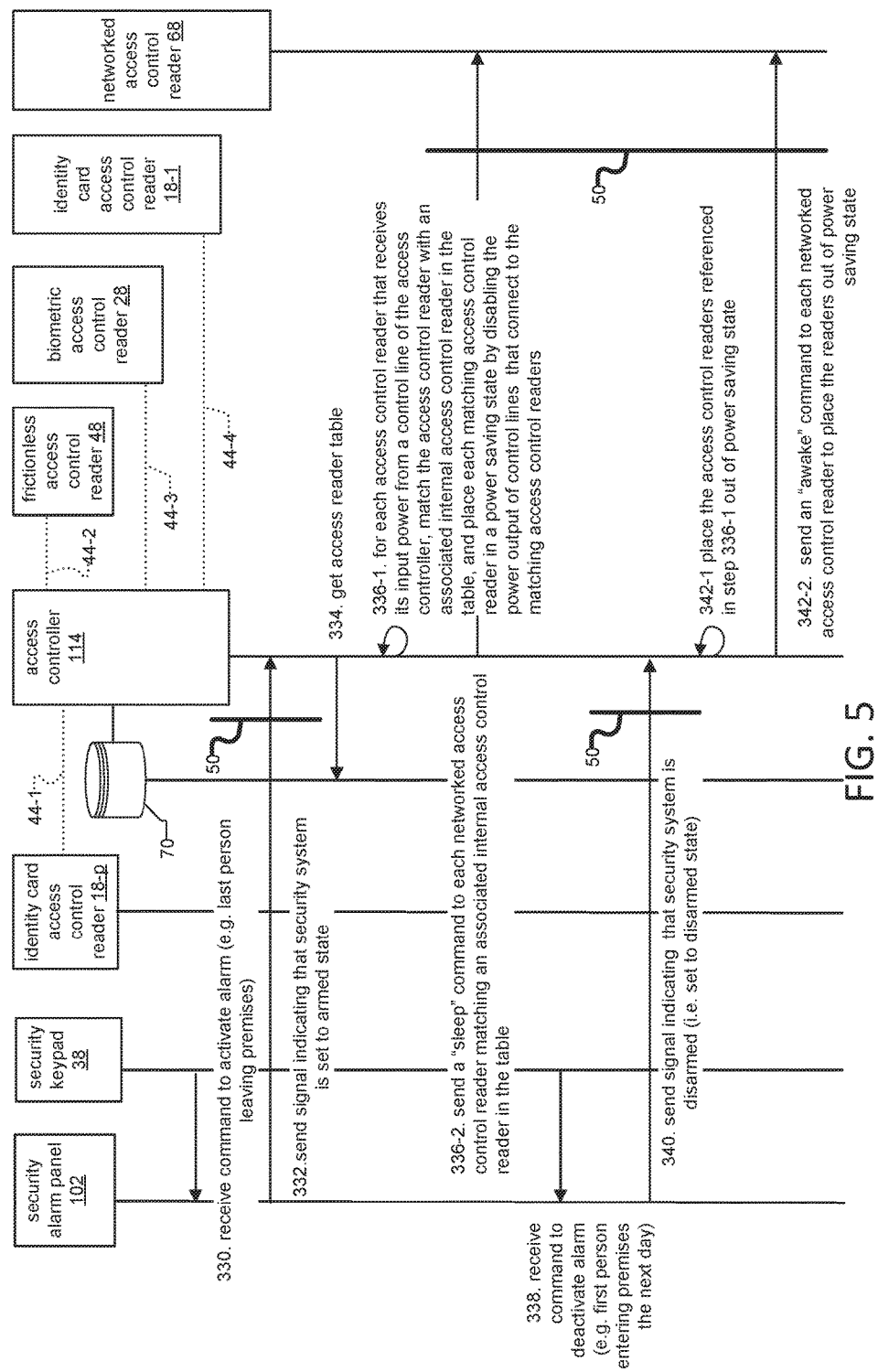
FIG. 5 is a sequence diagram that illustrates another example of operation for the energy saving security system of FIG. 1.

FIG. 5 is a sequence diagram that illustrates another example of operation of the security system 20 in FIG. 1. As in the example of FIG. 4, the security system 20, via its access controller 114, places different access control readers in a power saving state. The access controller 114 places the access control readers in a power saving state in response to the access controller 114 assessing that the building 90 is unoccupied. The building is assessed as being unoccupied, in one example, in response to the access controller 114 receiving a signal from the security alarm panel 102 indicating that the security system 20 is in an armed state.

Then, the access controller 114 places the access control readers out of power saving state in response to a different condition being satisfied than in FIG. 4. Specifically, in FIG. 5, the access controller 114 places the access control readers out of power saving state in response to receiving a signal indicating that the security system 20 is disarmed/set to a disarmed state.

In step 330, the security alarm panel 102 receives a command to activate the alarm/place the security system 20 in an armed state. In the example, an individual that is the last to leave the building 90 on a normal work day, for example, enters the command via the security keypad 38. According to step 332, in response to the security alarm panel 102 receiving the command, the security alarm panel 102 sends a signal over the network 50 indicating that the security system 20 is armed (i.e. set to an armed state), which the access controller 114 receives over the network 50.

In response to receiving the signal over the network 50 indicating that the security system 20 is armed, the access controller 114 obtains the contents of the access reader table 80 in step 334.

Step 336 describes examples for how access control readers of different types can be placed into a power saving state by the access controller 114.

In step 336-1, for each access control reader that receives its input power from a control line 44 of the access controller 114, the access controller 114 executes a lookup of the access control readers against entries 33 in the access reader table 80. The access controller 114 matches the access control readers with an associated internal access control reader in the table 80, and places each matching reader in a power saving state by disabling the power output of the control line that connects to the matching access control reader, in one example.

As a result of step 336-1 and with reference to FIG. 5, for example, the access controller 114 places the identity card access control reader 18-p, the frictionless access control reader 48, the biometric access control reader 28, and the identity card access control reader 18-1 in a power saving state by switching off the power signal normally sent over control lines 44-1, 44-2, 44-3, and 44-4, respectively.

In a similar fashion, in step 336-2, the access controller 114 places access control readers in a power saving state by sending a "sleep" command to each networked access control reader 68 matching an associated internal access control reader in the table 80.

The next morning, an individual is the first to arrive at the building 90 and uses the security keypad 38 to send a command to the security alarm panel in order to deactivate the alarm. In step 338, the security alarm panel 102 receives the command to deactivate the alarm, and in response, sends a signal indicating that the security system 20 is disarmed (i.e. set to disarmed state) over the enterprise network 50 in step 340.

In response to receiving the signal over the network 50 indicating the security system 20 is disarmed, the access controller 114, in step 342-1, places the access control readers referenced in step 336-1 out of power saving state by resuming/switching back on the source of input power to control lines 44-1 through 44-4, in one example. Also in response, in step 342-2, the access controller 112 sends an "awake" command over the network 50 to each networked access control reader 68 to place the readers 68 out of power saving state.

Figure 6:
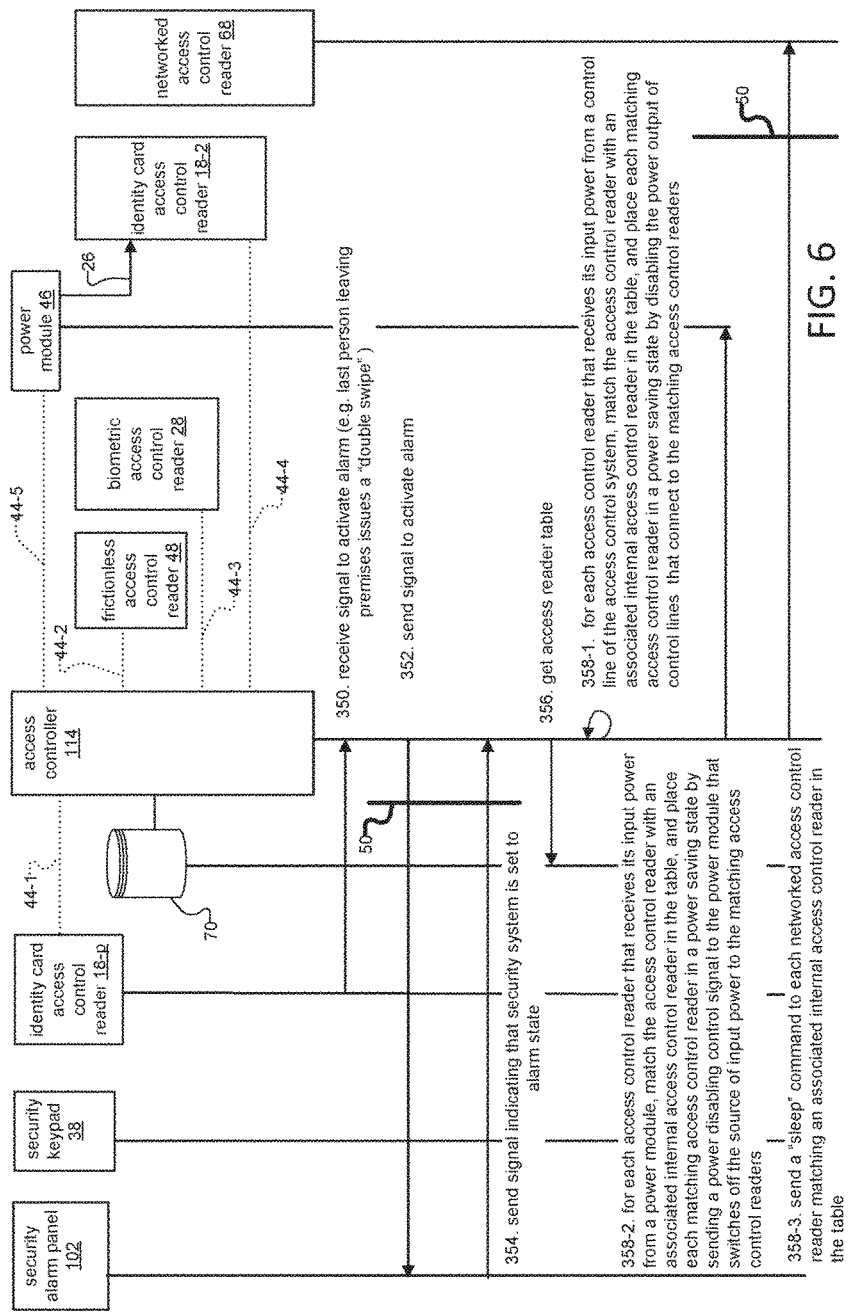
FIG. 6 is a sequence diagram that illustrates an example of operation for the energy saving security system of FIG. 2.

FIG. 6 is a sequence diagram that illustrates an example of operation of the security system 20 in FIG. 2.

In step 350, the access controller 114 receives a command to activate the alarm/place the security system 20 in an armed state. In the example, the command to arm the system is sent by the identity card access control reader 18-p to access control panel 114. The command is sent in response to an individual executing a "double swipe" of a key card 12 at identity card access control reader 18-p, which is located near the perimeter of the building 90. The individual is the last individual to exit the building in a normal work day, in one example.

In step 352, the access controller 114 then sends a signal over the network 50 to activate the alarm. Upon receiving this signal in step 354, the security alarm panel 102 sends a signal over the network 50 indicating that the security system 20 is armed (i.e. set to an armed state), which the access controller 114 then receives over the network 50.

In response to receiving the signal over the network 50 indicating that the security system 20 is armed, the access controller 114 obtains the contents of the access reader table 80 in step 356.

Step 358 describes examples for how access control readers of different types can be placed into a power saving mode by the access controller 114.

In step 358-1, for each access control reader that receives its input power from a control line 44 of the access controller 114, the access controller 114 executes a lookup of the access control readers against entries 33 in the access reader table 80. The access controller 114 matches the access control readers with an associated internal access control reader in the table 80, and places each matching reader in a power saving state by disabling the power output of the control line that connects to the matching access control reader.

As a result of step 358-1 and with reference to FIG. 6, for example, the access controller 114 places the identity card access control reader 18-p, the frictionless access control reader 48, and the biometric access control reader 28 in a power saving state by switching off the power signal normally sent over control lines 44-1, 44-2, and 44-3, respectively.

In step 358-2, for each access control reader that receives its source of input power from a power module 46, the access controller 114 matches the access control reader with an associated internal access control reader in the table 80, and places each matching access control reader in a power saving state. The access controller 114 places each matching access control reader in a power saving state by sending a power disabling control signal to the associated power module 46, in one example, which switches off the source of input power to the matching access control readers. In FIG. 6, for example, the access controller 114 sends a signal via control line 44-5 to the power module 46, where the signal specifies that the power module 46 switch off its source of input power (indicated by reference 26) to identity card access control reader 18-2.

Finally, in step 358-3, the access controller 114 places access control readers in a power saving state by sending a "sleep" command to each networked access control reader 68 matching an associated internal access control reader in the table 80.

It can also be appreciated that the access controller 114 may not be integrated with a security alarm panel 102, and/or that the integrated security alarm panel 102 and its security devices may not be in operation. In this case, the access controller 114 can still assess that the building is unoccupied, in one example, by determining that the number of individuals that have entered the building matches the number of individuals that have exited the building. In one example, the access controller 114 makes this assessment at the end of a work day as each individual exits the building 90.

More specifically, the building is assessed to be unoccupied by the access controller 114 by first receiving indications that individuals have entered and/or exited the building sent from access control readers that control access to the building 90, such as identity card access control reader 18-p. The access controller 114 increments an enter count 32 in response to receiving the indication for each individual entering the building 90, and increments an exit count 42 in response to receiving the indication for each individual exiting the building 90. Finally, the access controller 114 assesses that the building is unoccupied by identifying that the enter count 32 and the exit count 42 are equal.

While this invention has been particularly shown and described with references to preferred embodiments thereof, it will be understood by those skilled in the art that various changes in form and details may be made therein without departing from the scope of the invention encompassed by the appended claims.

What is claimed is:

1. A security system, comprising:
   access control readers controlling access to a building and/or to interior areas of the building; and
   an access controller that places the access control readers into power saving state when the building is assessed to be unoccupied,
   wherein the building is assessed to be unoccupied in response to the access controller receiving a signal indicating that a security alarm panel is armed.

2. A security system as claimed in claim 1, wherein the access control readers include interior access control readers that control access to the interior areas of the building and perimeter access control readers that control access to the building.

3. A security system as claimed in claim 2, wherein the access controller places only the interior access control readers into power saving state when the building is assessed to be unoccupied.

4. A security system as claimed in claim 1, wherein the building is assessed to be unoccupied by:
   the access controller receiving indications that individuals have entered and/or exited the building sent from access control readers, the access controller incrementing an enter count in response to receiving the indication for each individual entering the building and incrementing an exit count in response to receiving the indication for each individual exiting the building; and
   the access controller identifying that the enter count and the exit count are equal.

5. A security system as claimed in claim 1, wherein the access controller places the access control readers into power saving state by disabling control lines of the access controller that control and provide power to the access control readers.

6. A security system, comprising:
   access control readers controlling access to a building and/or to interior areas of the building; and
   an access controller that places the access control readers into power saving state when the building is assessed to be unoccupied; and
   wherein the access controller places the access control readers into power saving state by sending a power disabling control signal to a power module that provides power to the access control readers.

7. A security system, comprising:
   access control readers controlling access to a building and/or to interior areas of the building; and
   an access controller that places the access control readers into power saving state when the building is assessed to be unoccupied; and
   wherein the access controller places the access control readers into power saving state by sending a sleep signal over a network to the access control readers.

8. A security system, comprising:
   access control readers controlling access to a building and/or to interior areas of the building; and
   an access controller that places the access control readers into power saving state when the building is assessed to be unoccupied; and
   a security alarm panel that receives indications of intrusions at the building from security devices and that sends alarm signals in response, wherein the access controller places the access control readers out of power saving state in response to the access controller receiving the alarm signals.

9. A security system, comprising:
   access control readers controlling access to a building and/or to interior areas of the building;
   an access controller that places the access control readers into power saving state when the building is assessed to be unoccupied; and
   a security alarm panel that sends a signal indicating that the security system is disarmed, wherein the access controller places the access control readers out of power saving state in response to the access controller receiving the disarm signal.

10. A method for a security system, the method comprising:
    access control readers controlling access to a building and/or to interior areas of the building; and
    an access controller placing the access control readers into power saving state when the building is assessed to be unoccupied, wherein the building is assessed to be unoccupied in response to the access controller receiving a signal indicating that the security system is armed.

11. A method as claimed in claim 10, wherein the access control readers include interior access control readers controlling access to the interior areas of the building and perimeter access control readers controlling access to the building.

12. A method as claimed in claim 11, further comprising the access controller placing only the interior access control readers into power saving state when the building is assessed to be unoccupied.

13. A method as claimed in claim 10, wherein the building is assessed to be unoccupied by:
    the access controller receiving indications that individuals have entered and/or exited the building sent from access control readers that control access to the building, the access controller incrementing an enter count in response to receiving the indication for each individual entering the building and incrementing an exit count in response to receiving the indication for each individual exiting the building; and
    the access controller identifying that the enter count and the exit count are equal.

14. A method as claimed in claim 10, further comprising the access controller disabling control lines that control and provide power to the access control readers.

15. A method as claimed in claim 10, further comprising the access controller sending a power disabling control signal to a power module that provides power to the access control readers.

16. A method as claimed in claim 10, further comprising the access controller sending a sleep signal over a network to the access control readers.

17. A method as claimed in claim 10, further comprising the access controller placing the access control readers out of power saving state in response to the access controller receiving an alarm signal sent from a security alarm panel, wherein the alarm signal is sent in response to an indication of intrusion at the building.

18. A method as claimed in claim 10, further comprising the access controller placing the access control readers out of power saving state in response to the access controller receiving a signal sent from a security alarm panel indicating that the security system is disarmed.

* * * * *